(12) United States Patent
Hobbs

(10) Patent No.: US 10,207,375 B2
(45) Date of Patent: Feb. 19, 2019

(54) METHODS FOR SOLID STATE METAL REPAIR

(71) Applicant: United Technologies Corporation, Hartford, CT (US)

(72) Inventor: Douglas Hobbs, Jupiter, FL (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 566 days.

(21) Appl. No.: 14/576,653

(22) Filed: Dec. 19, 2014

(65) Prior Publication Data

US 2015/0190889 A1 Jul. 9, 2015

Related U.S. Application Data

(60) Provisional application No. 61/924,485, filed on Jan. 7, 2014.

(51) Int. Cl.
| | |
|---|---|
| *F41A 15/22* | (2006.01) |
| *B23P 6/00* | (2006.01) |
| *F41H 5/00* | (2006.01) |
| *F41H 5/04* | (2006.01) |

(52) U.S. Cl.
CPC .............. *B23P 6/00* (2013.01); *F41A 15/22* (2013.01); *F41H 5/00* (2013.01); *F41H 5/045* (2013.01); *Y10T 29/49734* (2015.01); *Y10T 29/5191* (2015.01); *Y10T 408/893* (2015.01)

(58) Field of Classification Search
CPC ...... B23P 6/00; F41H 5/045; Y10T 29/49734; Y10T 29/49737; Y10T 29/49732
See application file for complete search history.

(56) References Cited

U.S. PATENT DOCUMENTS

| | | | | |
|---|---|---|---|---|
| 5,190,611 A | * | 3/1993 | Cologna | B29C 73/063 156/94 |
| 5,466,100 A | * | 11/1995 | Ahluwalia | B23B 31/005 408/224 |
| 2005/0163921 A1 | * | 7/2005 | Looper | B05D 5/005 427/140 |

* cited by examiner

*Primary Examiner* — Sarang Afzali
*Assistant Examiner* — Ruth F Hidalgo-Hernandez
(74) *Attorney, Agent, or Firm* — Snell & Wilmer L.L.P.

(57) ABSTRACT

A system and method for solid state metal plate repair is provided. A solid state metal plate repair system may comprise a drill, a cutter and a plug. The plug may be configured to fill a void created by the cutter. The plug may also be configured to create a metallurgical bond with the metal plate during a repair operation. The plug may also be configured to shear from the drill (e.g., drive motor) when an expected rise in torque indicates a sufficient bond has been achieved in the repair. The systems and methods described herein may be used on specialty alloys wherein other repair methods are undesirable.

11 Claims, 4 Drawing Sheets

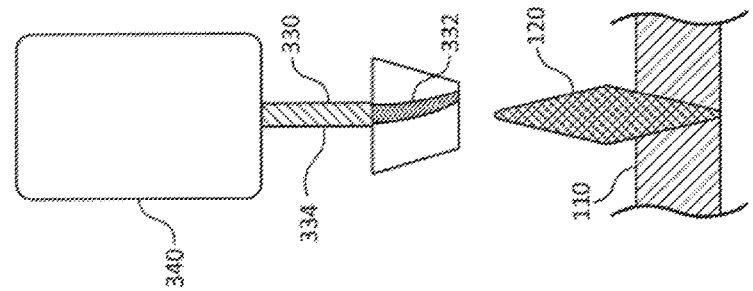
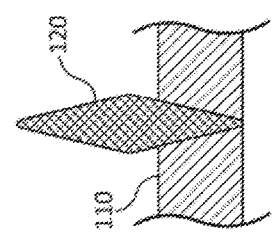
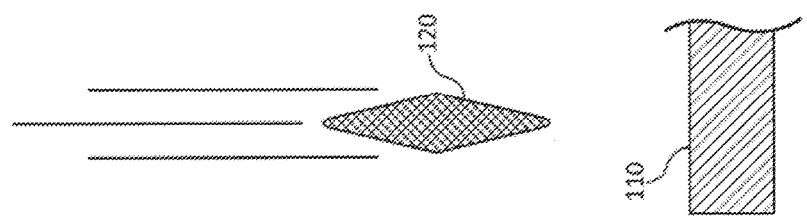
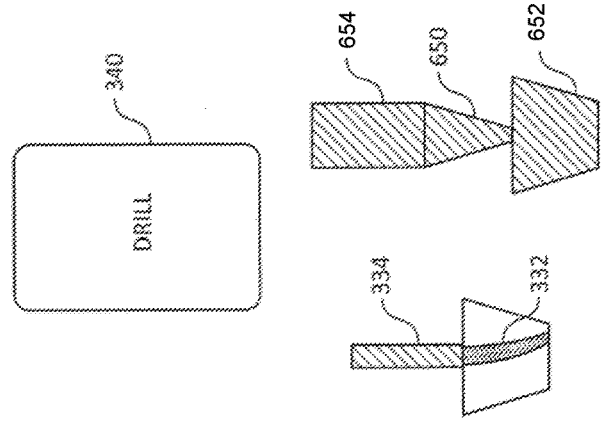

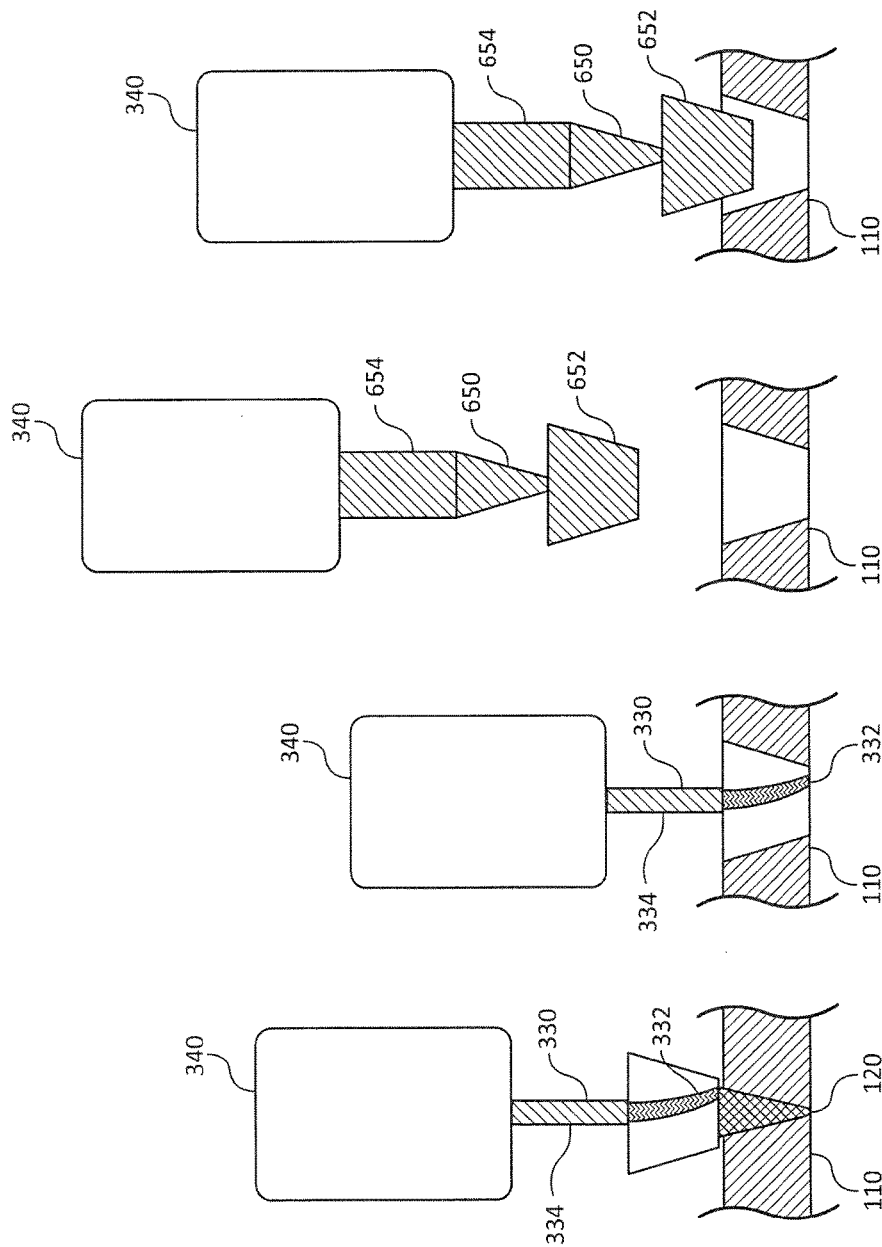

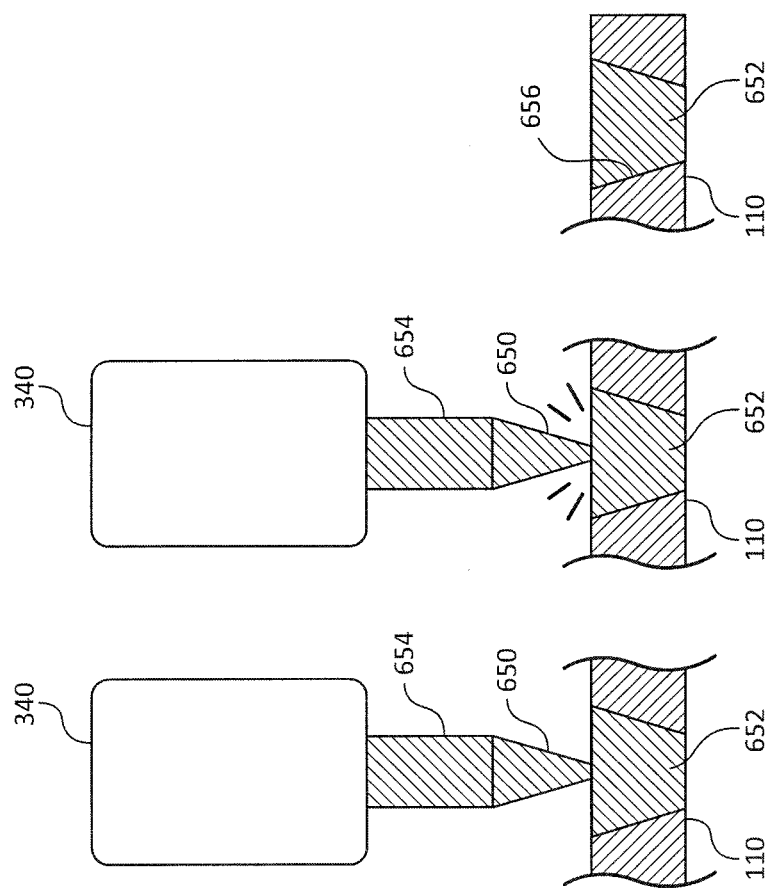

METHODS FOR SOLID STATE METAL REPAIR

CROSS-REFERENCE TO RELATED APPLICATIONS

This application is a nonprovisional of, and claims priority to, and the benefit of U.S. Provisional Application No. 61/924,485, entitled "SYSTEMS AND METHODS FOR SOLID STATE METAL REPAIR," filed on Jan. 7, 2014, which is hereby incorporated by reference in its entirety.

FIELD

The present disclosure relates to repair of metal plates (e.g., armor), and more specifically, to systems and methods for solid state repair of metal plates.

BACKGROUND

Conventional armor for defeating small projectiles may suffer damage that requires repair and/or replacement at high cost and time allotment. Repair operations may include welding of conventional armor materials (e.g., cold rolled steel plate) to repair damaged portions of armor. Advanced materials (e.g., Pandalloy® aluminum alloys) may not be welded without losing or impairing their advantageous properties.

SUMMARY

A method for solid state repair of a metal plate may comprise removing a portion of a damaged portion of a plate, wherein the damaged portion is removed by a cutter operatively coupled to a drill to form a tapered hole; and advancing a rotating plug comprising a plug body and shaft into the tapered hole created by the cutter, wherein friction between the plug and an interior surface defining the tapered bond the pug and the interior surface.

In various embodiments, a solid state metal repair system may comprise a drill, a cutter and a plug. The cutter may be capable of being operatively coupled to the drill. The cutter may also be configured to rotatably remove a damaged a portion of a plate when driven by the drill. In this regard, the cutter may create a void in the plate. The plug may be capable of being operatively coupled to the drill. The plug may also be configured to fill the void in the plate. In this regard, the plug may be deposited in the void.

A solid state method of repairing a metal plate may comprise removing a first portion of a projectile from an armor plate, wherein the first portion protrudes above an outer surface of the armor plate, and wherein the damaged portion is removed by a cutter; advancing the cutter into the armor plate to remove the projectile from the armor plate to create a void in the armor plate; and advancing the rotating plug into the void, wherein the plug bonds to the walls defining the void in the armor plate.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 illustrates a solid state repair system, in accordance with various embodiments;

FIGS. 2-3 illustrate a projectile striking a plate;

FIGS. 4-6 illustrate a first portion of an exemplary solid state repair system conducting steps of an exemplary solid state repair method, in accordance with various embodiments;

FIGS. 7-10 illustrate a second portion of an exemplary solid state repair system conducting steps of an exemplary solid state repair method, in accordance with various embodiments;

FIG. 11 illustrates a plate repaired by an exemplary solid state repair system conducting exemplary steps of a solid state repair method, in accordance with various embodiments.

DETAILED DESCRIPTION

Figure 12:
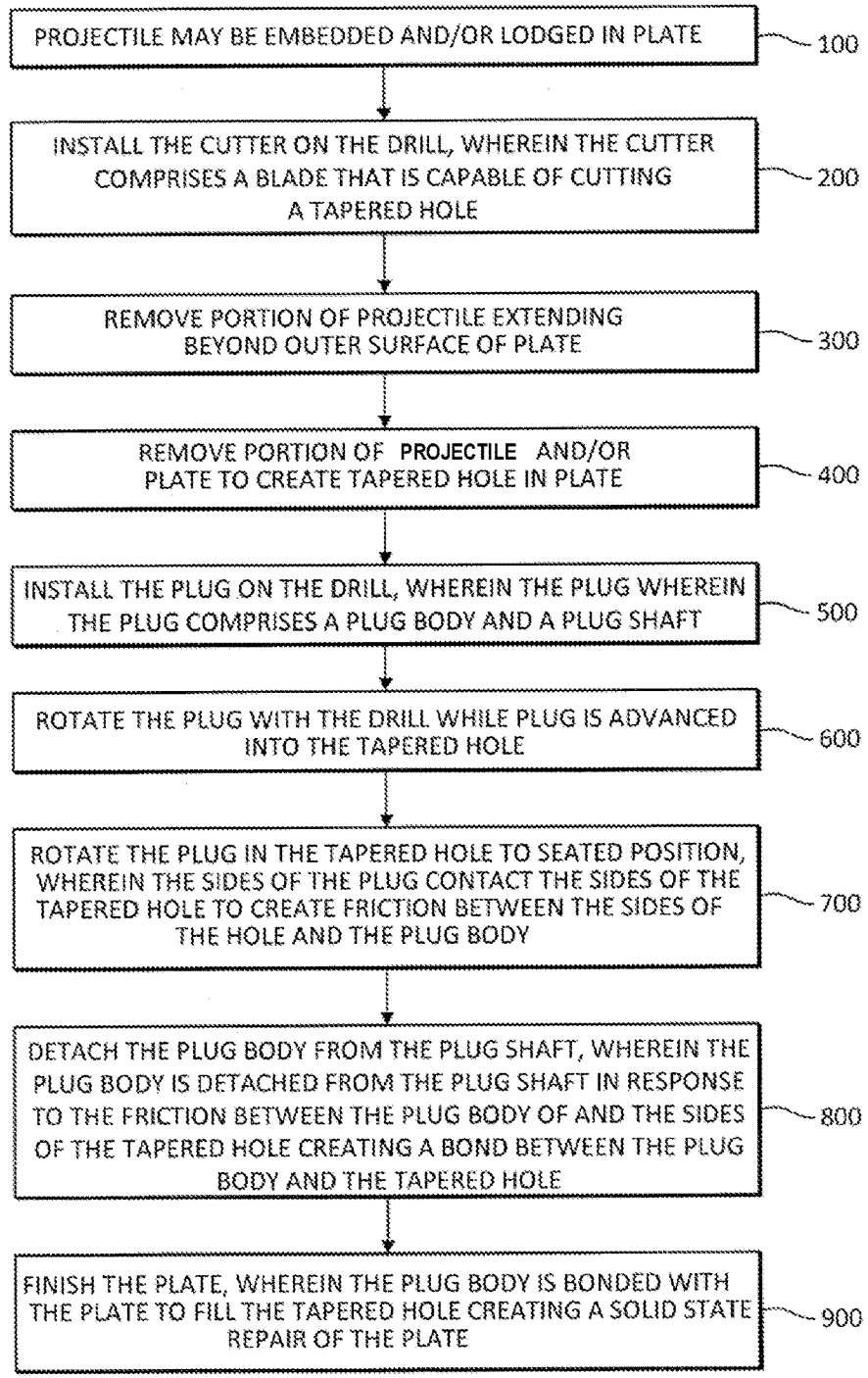
FIG. 12 is a process flow of a solid state repair method, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments and with reference to FIG. 1, a solid state metal repair system may comprise a drill 340, a cutter 330, and a plug 650. The solid state metal repair system may be configured to remove damaged areas of the plate of metal with cutter 330, creating a void. The solid state metal repair system may also be configured to repair and/or fill the void with plug 650.

In various embodiments, cutter 330 may comprise a blade 332 and a shaft 334. Cutter 330 may be configured to operatively couple to and be rotated and/or driven by drill 340. In this regard, shaft 334 may be installable in a chuck or other suitable retention device of drill 340. Cutter 330 and, more specifically, blade 332 may be configured to rotatably cut and/or remove a damaged portion (e.g., damage from a projectile that may include at least a portion of the projectile) and/or parent metal from a metal plate or sheet (e.g., metal armor for a vehicle) to create a void (e.g., a tapered hole).

In various embodiments, a body of cutter 330 may have a frustoconical shape. Blade 332 may be disposed on the surface of the shape. During rotation, blade 332 may remove material to leave a hole or indentation that reflects the geometry of the body of the cutter 330 (e.g., a frustoconical hole).

In various embodiments, plug 650 may comprise a plug body 652 and a plug shaft 654. Plug shaft 654 may be operatively coupled to and/or attached to plug body 652. Plug shaft 654 may be operatively coupled to and/or configured to be driven by drill 340. Plug body 652 may be capable of filling the void created by cutter 330.

In various embodiments and in operation, a user may stock varying sizes of cutters 330. A user may similarly stock varying sizes of plug 650. In this regard, the sizes of plug 650 may correspond and/or be associated with the size of cutter 330

In various embodiments, drill 340 may be any suitable drill and/or milling system. For example, drill 340 may be a hand held drill, a magnetic base drill, a vacuum drill, and/or any other suitable drill and/or milling system. Drill 340 may be configured with sufficient power to drive the largest stocked size either cutter 330 and/or plug 650 and as a result could drive all sizes of cutters 330 and/or plugs 650.

In various embodiments, overlapping repairs may accommodate damage larger than the largest practical preform. In this regard, depending on the styles and/or sizes of plug 650 that are available, a plurality of small plugs 650 may be used to repair various areas of plate 110. Alternatively, a single large plug 650 may be used to an area comprises a plurality of instances of damage in plate 110. Moreover, because the repair is solid state, a first plug 650 may be used to repair plate 110 and a second plug 650 may be used to repair plate 110 where second plug 650 is configured to occupy a portion of first plug 650.

In various embodiments, drill 340, one or more cutters 330 and one or more plugs 650 (e.g., a solid state repair system) may be carried with the vehicle or mounted on a special service vehicle (e.g., a repair vehicle).

A method for performing a solid state repair on a metal plate (e.g., armor) is provided. In various embodiments and with reference to FIGS. 2-3 and 12, a projectile 120 may be discharged and/or shot at plate 110 (e.g., armor plate), as shown in FIG. 2. Projectile 120 may be stopped by, lodged in, retained in, and/or otherwise embedded in plate 110, as shown in FIG. 2 (Step 100).

In various embodiments and with reference to FIGS. 4-6 and 12, cutter 330 may be attached to a drill 340 (Step 200). Cutter 330 may comprise a blade 332 that is capable of cutting a tapered hole in plate 110. In this regard, cutter 330 may also be capable of cutting and/or removing projectile 120. Optionally, cutter 330 may be rotated and applied to projectile 120 to remove a portion of projectile 120 extending beyond an outer surface of plate 110 (Step 300). Cutter 330 may be advanced into plate 110. Cutter 330 may be configured to remove a portion of plate 110 and/or a portion of projectile 120 embedded and/or lodged in plate 110. In this regard, projectile 120 may be harder than plate 110, requiring a more expensive cutter 330 (e.g., a carbide cutter) to remove projectile 120. As such, cutter 330 may be configured to remove a portion of plate 110 surrounding projectile 120 resulting in the removal of projectile 120 from plate 110. Cutter 330 may also create a tapered hole in plate 110 (step 400). In this regard, cutter 330 may be configured to remove material from projectile 120 and material from plate 110 (e.g., parent metal from plate 110).

In various embodiments and with reference to FIGS. 7-10 and 12, plug 650 may be coupled to drill 340 (step 500). Drill 340 may be configured to rotate plug 650 while plug 650 is advanced into the tapered hole (step 600). Plug 650 may be rotated into the tapered hole to a seated position (step 700) as shown in FIG. 9. In this regard, the sides of plug body 652 may contact the sides of the tapered hole to create friction between the sides of the hole and plug body 652. Drill 340 may continue to rotate plug 650. The torque created by drill 340 may cause plug 652 to separate from plug shaft 654 (step 800).

In various embodiments, plug body 652 may be detached from plug shaft 654 in response to the friction between plug body 652 and the sides of the tapered hole, creating a bond between the plug body 652 and the tapered hole. In this regard, plug body 652 may be inertia welded to plate 110 filling the tapered hole and creating a solid state repair. Plug body 652 may also gall with plate 110 filling the tapered hole and creating a solid state repair. The repair (e.g., plug body 652 in plate 110) may finish and/or create a nearly indiscernible repair of plate 110 and/or metallurgy associated with plate 110 (step 900). In this regard, an inspection of the metal and/or metal structures of plate 110 and the plug body 652 may be nearly identical. More specifically, the solid-state seam is virtually metallurgically identical to the surrounding parent material. However, in traditional metal repair processes like welding and brazing, a dis-similar layer is developed between a repair and the parent material. In welding, the weld is like a cast structure. In brazing, the braze is a secondary material that is melted, "gluing" the two pieces together.

In various embodiments, any subsequent projectiles may not follow a solid state seam 656 created between plug body 652 and plate 110, as shown in FIG. 11. The angled configuration of the tapered hole in plate 110, may also load body plug 652 in compression in response to being rotated into the tapered hole and a subsequent impact from a second projectile. In this regard, the conical nature of the repair means that a second projectile is very unlikely to strike exactly along the seam of the repair, but rather at an angle to the seam. As such, the repair may be homogeneous repair, which maintains the design properties of the material system.

In various embodiments, the solid state repair system and method add no weight to a repaired plate 110 that has been subjected to the solid state repair methods described herein. In this regard, the repair simply replaces damaged material.

In armor plate embodiments, plate 110 may be Pandalloy® aluminum alloy, a structurally amorphous material, a discontinuous reinforced aluminum and/or any other suitable metal, alloy, composite, and/or the like. In this regard, plate 110 may be a secondary phase strengthened aluminum alloy. Plate 110 may be a material system that is not considered repairable by conventional welding or brazing. In this regard, plate 110 may not tolerate liquid-phase repairs, because the liquid-phase repairs may alter and/or change the material properties of the parent material and/or material system.

In various embodiments, plate 110 may be mild steel that is repaired with a solid state repair. In this regard, the weld in mild steel is brittle and does not share the design properties of the original system and/or parent material. As such, plate 110 made of mild steel would benefit from the systems and method described herein.

Moreover, commercial acceptance of a light weight specialty alloys (e.g., Pandalloy® aluminum alloy) as armor may be unlikely without a cost-effective repair method. The solid state repair systems and methods described herein may provide the cost-effective repair of the light weight specialty materials to make these materials viable as armor. In this regard and in embodiments where the advanced material is used as armor for vehicles, weight reduction, especially near the top of a vehicle, is extremely attractive for fuel savings and lower center-of-gravity to reduce rollover events.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   removing a damaged portion of a plate and a projectile lodged in the damaged portion of the plate, wherein the damaged portion and the projectile are simultaneously removed by a cutter operatively coupled to a drill to form a tapered hole, wherein the cutter is hollow and cuts entirely through the plate surrounding the projectile without cutting any portion of the projectile embedded in the plate; and advancing a rotating plug comprising a plug body and a shaft into the tapered hole created by the cutter, wherein friction between the plug and an interior surface defining the tapered hole bonds the plug and the interior surface.

2. The method of claim 1, wherein removing the damaged portion of the plate and the projectile comprises cutting around the projectile, wherein a first material of the projectile is harder than a second material of the plate.

3. The method of claim 2, wherein the first material of the projectile is harder than a third material of the cutter.

4. The method of claim 1, wherein the cutter comprises a frustoconical surface having a blade disposed on the frustoconical surface.

5. The method of claim 4, wherein the blade extends at an angle relative to a rotational axis of the cutter.

6. The method of claim 1, wherein the plate is an armor plate for a vehicle.

7. The method of claim 6, wherein the plate is cold rolled steel.

8. The method of claim 1, wherein the plug body is brazed to the interior surface.

9. The method of claim 1, wherein the friction between the plug body and the interior surface creates a bond between the plug body and the tapered hole.

10. The method of claim 1, wherein the plug is metallurgical similar to the plate.

11. The method of claim 1, wherein the plate is Pandalloy® aluminum alloy.

* * * * *